United States Patent
Kazami

(10) Patent No.: US 9,635,280 B2
(45) Date of Patent: Apr. 25, 2017

(54) IMAGE PICKUP APPARATUS, METHOD OF CONTROLLING IMAGE PICKUP APPARATUS, AND NON-TRANSITORY COMPUTER-READABLE STORAGE MEDIUM

(71) Applicant: CANON KABUSHIKI KAISHA, Tokyo (JP)

(72) Inventor: Yusuke Kazami, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 14/689,348

(22) Filed: Apr. 17, 2015

(65) Prior Publication Data
US 2015/0326772 A1 Nov. 12, 2015

(30) Foreign Application Priority Data
May 9, 2014 (JP) ................................. 2014-097578

(51) Int. Cl.
H04N 5/262 (2006.01)
H04N 5/238 (2006.01)
H04N 5/232 (2006.01)
H04N 5/235 (2006.01)

(52) U.S. Cl.
CPC ........... *H04N 5/238* (2013.01); *H04N 5/2351* (2013.01); *H04N 5/2352* (2013.01); *H04N 5/2353* (2013.01); *H04N 5/2356* (2013.01); *H04N 5/23212* (2013.01); *H04N 5/23232* (2013.01)

(58) Field of Classification Search
None
See application file for complete search history.

(56) References Cited

U.S. PATENT DOCUMENTS

| | | | |
|---|---|---|---|
| 8,023,000 B2 | 9/2011 | Tamaru | |
| 2008/0259176 A1 | 10/2008 | Tamaru | |
| 2008/0291311 A1* | 11/2008 | Kusaka | G02B 7/346 348/308 |
| 2009/0231465 A1* | 9/2009 | Senba | H04N 5/23248 348/229.1 |
| 2010/0215354 A1* | 8/2010 | Ohnishi | G02B 7/38 396/113 |

FOREIGN PATENT DOCUMENTS

JP 2008-271240 A 11/2008

\* cited by examiner

*Primary Examiner* — Stephen Coleman
(74) *Attorney, Agent, or Firm* — Fitzpatrick, Cella, Harper & Scinto

(57) ABSTRACT

An image pickup apparatus includes a determination unit configured to determine, based on luminance information of an object, a shooting condition from among a plurality of shooting conditions containing information on an aperture value and a shutter speed, a control unit configured to perform control so as to sequentially shoot a plurality of images having in-focus positions different from each other while discretely moving a focus lens by each moving amount depending on the aperture value, and an image synthesizing unit configured to synthesize the plurality of images, and the determination unit determines the shooting condition from among the plurality of shooting conditions so as to reduce a time for shooting the plurality of images.

11 Claims, 7 Drawing Sheets

|   | (A) APERTURE VALUE | (B) SHUTTER SPEED [s] |
|---|---|---|
| I | F2.0 | 1/250 |
| II | F2.8 | 1/125 |
| III | F4.0 | 1/60 |
| ⋮ | ⋮ | ⋮ |
| X | F32 | 1 |

FIG. 5A

|   | (A) APERTURE VALUE | (C) BRACKETING WIDTH [PULSE] | (D) NECESSARY NUMBER (※1) | (E) FOCUS BRACKETING TIME [s] (※2) |
|---|---|---|---|---|
| I | F2.0 | 100 | 10 | 0.9 |
| II | F2.8 | 150 | 7 | 0.9 |
| III | F4.0 | 200 | 5 | 0.8 |
| ⋮ | ⋮ | ⋮ | ⋮ | ⋮ |
| X | F32 | 500 | 2 | 0.5 |

※1 : ON CONDITION THAT FOCUSABLE RANGE (MOVABLE AMOUNT OF FOCUS LENS) IS 100 [PULSE]

※2 : ON CONDITION THAT DRIVE SPEED OF FOCUS LENS IS 1000 [PULSE/SEC]

FIG. 5B

| | (B) SHUTTER SPEED [s] | (D) NECESSARY NUMBER | (F) IMAGE SHOOTING TIME [s] |
|---|---|---|---|
| I | 1/250 | 10 | 0.04 |
| II | 1/125 | 7 | 0.056 |
| III | 1/60 | 5 | 0.0833 |
| ⋮ | ⋮ | ⋮ | ⋮ |
| X | 1 | 2 | 2 |

FIG. 5C

| | (A) APERTURE VALUE | (B) SHUTTER SPEED [s] | (G) ALL-IN-FOCUS IMAGE SHOOTING TIME [s] |
|---|---|---|---|
| I | F2.0 | 1/250 | 0.94 |
| II | F2.8 | 1/125 | 0.956 |
| III | F4.0 | 1/60 | 0.8833 |
| ⋮ | ⋮ | ⋮ | ⋮ |
| X | F32 | 1 | 2.5 |

FIG. 5D

IMAGE PICKUP APPARATUS, METHOD OF CONTROLLING IMAGE PICKUP APPARATUS, AND NON-TRANSITORY COMPUTER-READABLE STORAGE MEDIUM

BACKGROUND OF THE INVENTION

Field of the Invention

The present invention relates to an image pickup apparatus capable of obtaining an all-in-focus image by focus bracketing.

Description of the Related Art

Previously, an image pickup apparatus which performs an all-in-focus image shooting has been known. The all-in-focus image shooting is a shooting, by the image pickup apparatus, in which a plurality of images that have different in-focus positions over an entire region of a focusable object distance and only a focused region is extracted from each image to synthesize an image to obtain the image focused on an entire shooting region. In the all-in-focus image shooting, it is necessary to shoot a plurality of images by one shooting operation, and therefore it may take a long time to perform the all-in-focus image shooting.

Japanese Patent Laid-open No. 2008-271240 discloses a configuration in which a predetermined bracketing width (moving amount of a focus lens) is set to be decreased when a depth of field in the image shooting is shallow, and is to be increased when the depth of field is deep. According to the configuration disclosed in Japanese Patent Laid-open No. 2008-271240, changing the bracketing width depending on the depth of field in the image shooting, the number of shootings can be reduced when the depth of field is deep.

However, in the configuration disclosed in Japanese Patent Laid-open No. 2008-271240, for example when the shutter speed is slow, a shooting time per one image increases and thus the time required for one all-in-focus image shooting cannot be reduced in some cases.

SUMMARY OF THE INVENTION

The present invention provides an image pickup apparatus, a method of controlling the image pickup apparatus, and a non-transitory computer-readable storage medium that are capable of obtaining an all-in-focus image in a short time.

An image pickup apparatus as one aspect of the present invention includes a determination unit configured to determine, based on luminance information of an object, a shooting condition from among a plurality of shooting conditions containing information on an aperture value and a shutter speed, a control unit configured to perform control so as to sequentially shoot a plurality of images having in-focus positions different from each other while discretely moving a focus lens by each moving amount depending on the aperture value, and an image synthesizing unit configured to synthesize the plurality of images, and the determination unit determines the shooting condition from among the plurality of shooting conditions so as to reduce a time for shooting the plurality of images.

A method of controlling the image pickup apparatus as another aspect of the present invention includes a determination step of determining, based on luminance information of an object, a shooting condition from among a plurality of shooting conditions containing information on an aperture value and a shutter speed, a control step of performing control so as to sequentially shoot a plurality of images having in-focus positions different from each other while discretely moving a focus lens by each moving amount depending on the aperture value, and synthesis step of synthesizing the plurality of images, and in the determination step, the shooting condition is determined from among the plurality of shooting conditions so as to reduce a time for shooting the plurality of images.

A non-transitory computer-readable storage medium as another aspect of the present invention stores a program to cause a computer to execute a process including a determination step of determining, based on luminance information of an object, a shooting condition from among a plurality of shooting conditions containing information on an aperture value and a shutter speed, a control step of performing control so as to sequentially shoot a plurality of images having in-focus positions different from each other while discretely moving a focus lens by each moving amount depending on the aperture value, and synthesis step of synthesizing the plurality of images, and in the determination step, the shooting condition is determined from among the plurality of shooting conditions so as to reduce a time for shooting the plurality of images.

Further features and aspects of the present invention will become apparent from the following description of exemplary embodiments with reference to the attached drawings.

BRIEF DESCRIPTION OF THE DRAWINGS

FIG. 5A is a diagram of explaining a bracketing sequence determination process in this embodiment.

FIG. 5B is a diagram of explaining the bracketing sequence determination process in this embodiment.

FIG. 5C is a diagram of explaining the bracketing sequence determination process in this embodiment.

FIG. 5D is a diagram of explaining the bracketing sequence determination process in this embodiment.

DESCRIPTION OF THE EMBODIMENTS

Exemplary embodiments of the present invention will be described below with reference to the accompanied drawings.

[Overall Configuration of Image Pickup Apparatus]

Figure 1:
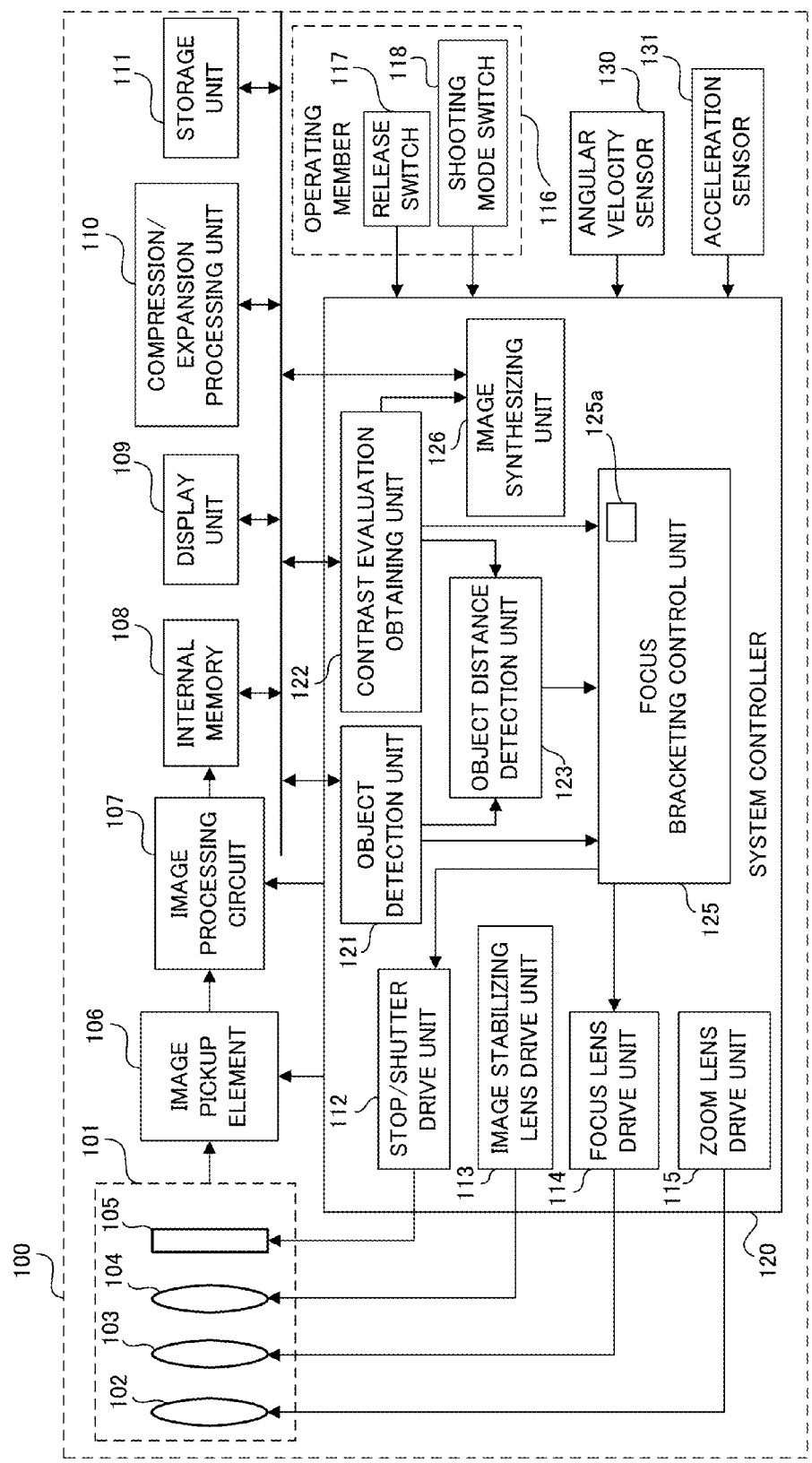
FIG. 1 is a block diagram of an image pickup apparatus in this embodiment.

First of all, referring to FIG. 1, the overall configuration of an image pickup apparatus in this embodiment will be described. FIG. 1 is a block diagram of an image pickup apparatus 100 (digital camera) in this embodiment.

In the image pickup apparatus 100 of FIG. 1, a lens barrel 101 includes a zoom lens 102, a focus lens 103, an image stabilizing lens 104 (collectively, lens units), and a stop/ shutter 105. The zoom lens 102 is movable in an optical axis direction so as to adjust a focal length (i.e., perform zooming) to optically change an angle of view. The focus lens 103 is movable in the optical axis direction so as to perform focusing. The image stabilizing lens 104 is a correction lens to correct an image blur caused by a hand shake, and it is movable in a plane orthogonal to the optical axis. The stop/shutter 105 adjusts the light intensity to be used for exposure control.

Light passing through the lens barrel 101 is received by an image pickup element 106 including a CCD (Charge Coupled Device), a CMOS (Complementary Metal-Oxide-Semiconductor), or the like to convert an optical signal (optical image) into an electric signal (image signal). The electric signal output from the image pickup element 106 is input to an image processing circuit 107. The image processing circuit 107 performs a pixel interpolation process, a color conversion process, or the like on the electric signal output from the image pickup element 106, and it outputs image data to an internal memory 108. The internal memory 108 includes a DRAM (Dynamic Random Access Memory), an SRAM (Static Random Access Memory), or the like.

A display unit 109 includes a TFT-LCD (Thin-film transistor liquid crystal display) and displays shot image data as well as shooting information. This information display such as live view can realize an electronic view finder (EVF) function to control the angle of view by a user. The data stored in the internal memory 108 is compressed or expanded by a compression/expansion processing unit 110 in accordance with an image format, and is stored in an external recording medium such as a memory card that is attached to the image pickup apparatus 100 to be used, or in a storage unit 111 embedded in the image pickup apparatus 100. The storage unit 111 includes, for example, a non-volatile memory. An object detection unit 121 specifies (detects) an object (object region or object information) contained in the image data. A contrast evaluation value obtaining unit 122 obtains a contrast evaluation value of the image data.

Subsequently, a drive unit that drives each unit of the lens barrel 101 will be described. A stop/shutter drive unit 112 calculates an exposure control value (aperture value and shutter speed) based on luminance information obtained by image processing of the image processing circuit 107, and it drives the stop/shutter 105 based on this calculation result. Accordingly, an auto exposure (AE) control can be performed.

An image stabilizing lens drive unit 113 calculates a vibration amount (hand-shake amount) that is applied to the image pickup apparatus 100 based on information from an angular velocity sensor 130 such as a gyro sensor or an acceleration sensor 131, and it drives the image stabilizing lens 104 to cancel the vibration amount. A focus lens drive unit 114 drives the focus lens 103. For example, the focus lens drive unit 114 drives the focus lens 103 in response to pressing a release switch 117 of an operating member 116 halfway in the control of a contrast autofocus (AF) detection method. The contrast evaluation value obtaining unit 122 obtains the contrast evaluation value in the drive of the focus lens 103. The focus lens drive unit 114 moves the focus lens 103 to a position where the contrast evaluation value is maximized to focus on the object. In this embodiment, focus control (focus detection control) is not limited to the contrast detection method, and a phase-difference detection method or other methods or the combination of these detection methods may be adopted. A zoom lens drive unit 115 drives the zoom lens 102 in response to a zoom operation instruction by the user.

A system controller 120 includes a processor such as a CPU (Central Processing Unit). The system controller 120 sends a control command to each unit of the image pickup apparatus 100 in response to the operation by the user to control a whole of the image pickup apparatus 100. The system controller 120 executes various control programs stored in the internal memory 108 such as programs to control the image pickup element 106, perform the AE/AF control, and perform the zoom control.

The operating member 116 includes a shooting mode switch 118, a menu operating button to perform various menu operations, and a zoom lever in addition to the release switch 117. The shooting mode switch 118 is an operator that is used to selectively switch an image shooting mode by the user, and in this embodiment, it is capable of switching a normal image shooting mode and an all-in-focus image shooting mode.

Subsequently, with respect to the system controller 120, control that is relevant to an all-in-focus image shooting and that is to be performed when the all-in-focus image shooting mode is selected by the shooting mode switch 118 will be described. The all-in-focus image shooting is performed mainly by the object detection unit 121, the contrast evaluation obtaining unit 122, an object distance detection unit 123, a focus bracketing control unit 125 (shooting condition determination unit 125a), and an image synthesizing unit 126 of the system controller 120. In this embodiment, the object detection unit 121 and the object distance detection unit 123 constitute an obtaining unit that obtains a position of the object or an object distance and object information such as luminance information.

The object detection unit 121 detects a predetermined object (object region or object information) from the image data stored in the internal memory 108. In this embodiment, as an example of an object detection method, a face detection process will be described. The face detection process is an object detection method to detect a human as an object based on face information, and it is a process to detect a facial region contained in the image data by using a known algorithm. For example, the object detection unit 121 extracts a feature amount from a square-shaped partial region on the image data and compares the feature amount with a prepared facial feature amount. When a correlation between them exceeds a predetermined threshold value, the object detection unit 121 determines that the partial region is the face region. The object detection unit 121 repeats the determination while variously changing the combination of the size of the partial region, the arrangement position, and the arrangement angle, and accordingly it is capable of detecting various face regions contained in the image data to set the face regions (detected regions) to be an object region. The object detection unit 121 is also capable of detecting an object (object region) other than the human by a known method of using color information, luminance information, a distribution of the contrast evaluation value in the image data, or the like.

Thus, the object detection unit 121 is capable of detecting the size or the position of the object region on the image data. The object detection unit 121 calculates a motion vector in the detected object region to be able to obtain whether the object is moving, a moving velocity of the object, or the like. In this embodiment, the information of the object detected by the object detection unit 121 may be referred to as object information.

The object distance detection unit 123 detects the object distance for the object detected by the object detection unit 121. In this embodiment, as an example, a method of detecting the object distance according to the contrast evaluation value obtained by the contrast evaluation value obtaining unit 122 will be described. The object distance detection unit 123, at an arbitrary timing, obtains the image data as needed while changing the position of the focus lens 103 over an entire movable range. Thus, the object distance detection unit 123 obtains a transition of the contrast evaluation value in the object region on the image data. Then, the object distance detection unit 123 determines the object distance of the object detected by the object detection unit 121 based on the transition of the contrast evaluation value in the object region. When a plurality of objects are detected by the object detection unit 121, the object distance detection unit 123 obtains the transition of the contrast evaluation value for each object region, and it determines the object distance for each object. In this embodiment, the method of detecting the object distance is not limited to this, and other methods such as a method of detecting the object distance using a sensor (focus detection sensor) by a phase-difference detection method can also be used.

The focus bracketing control unit 125 controls performing the all-in-focus image shooting by focus bracketing. In other words, the focus bracketing control unit 125 controls such that a plurality of images are sequentially shot while discretely moving the focus lens 103 with a predetermined bracketing width (moving amount).

In this embodiment, the focus bracketing control unit 125 includes the shooting condition determination unit 125a (determination unit). The shooting condition determination unit 125a determines a shooting condition in the focus bracketing based on the object information, the object distance, the hand-shake amount, and the contrast evaluation value of the image. Then, the focus bracketing control unit 125 drives the focus lens 103 or the stop/shutter 105 based on the determined shooting condition to shoot an image. Thus, the focus bracketing control unit 125 is a controller which performs control so as to sequentially shoot a plurality of images having in-focus positions different from each other (i.e. so as to perform the focus bracketing). Details of the method of determining the shooting condition in the focus bracketing will be described below.

The image synthesizing unit 126 synthesizes (combines), based on the contrast evaluation value, a plurality of image data shot based on an instruction from the focus bracketing control unit 125 to generate an image from the plurality of image data. Thus, the image synthesizing unit 126 is an image synthesizer that synthesizes a plurality of images. When synthesizing the images, the image synthesizing unit 126 first compares the contrast evaluation values of respective images based on the contrast evaluation value of each image determined by the contrast evaluation value obtaining unit 122. Then, the image synthesizing unit 126 extracts a pixel portion which has the highest contrast evaluation value from the plurality of image data. After that, the image synthesizing unit 126 overlaps the pixel portion extracted from each image for each pixel corresponding to each region in one finally-generated image to generate one image (image focused on all objects) from the plurality of images. In this embodiment, the pixel portion extracted from each image is not limited to one pixel, and as the pixel portion extracted from each image, a region (partial region including a plurality of pixels of an original image) obtained by segmentalizing a shot image (original image) into a predetermined size can also be adopted.

[Outline of All-In-Focus Image Shooting]

Next, referring to FIGS. 2A to 2D, the all-in-focus image shooting will be described. FIGS. 2A to 2D are diagrams of illustrating a situation where an object image is formed on an imaging plane in this embodiment.

Figure 2A:
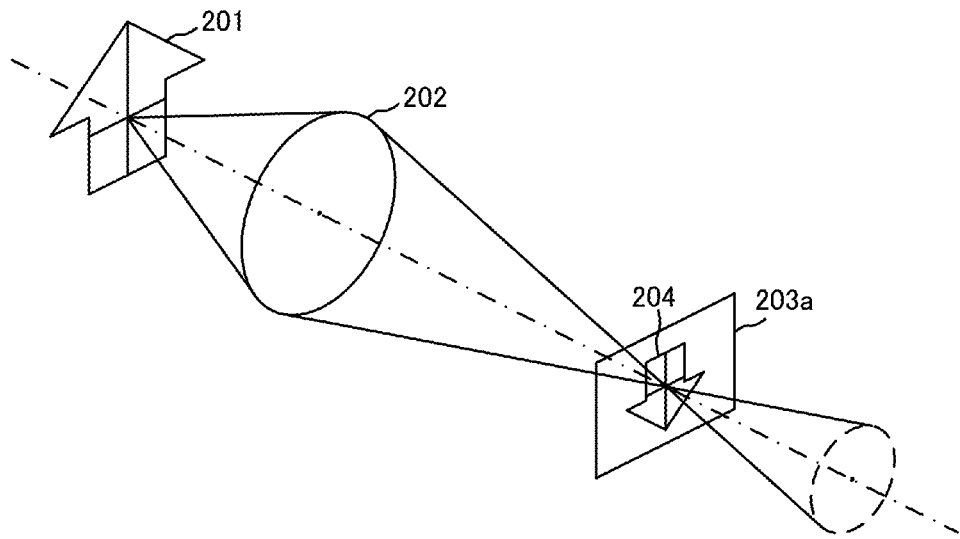
FIG. 2A is a diagram of illustrating a situation where an object image is formed on an imaging plane in this embodiment.

FIG. 2A illustrates a situation where an object 201 is imaged as an image 204 on a plane 203a (imaging plane) via an optical lens 202. In other words, when the plane 203a and an image sensor surface (surface of the image pickup element 106) coincide with each other, the object 201 is imaged as a "point" on the plane 203a to be recorded as an in-focus image.

Figure 2B:
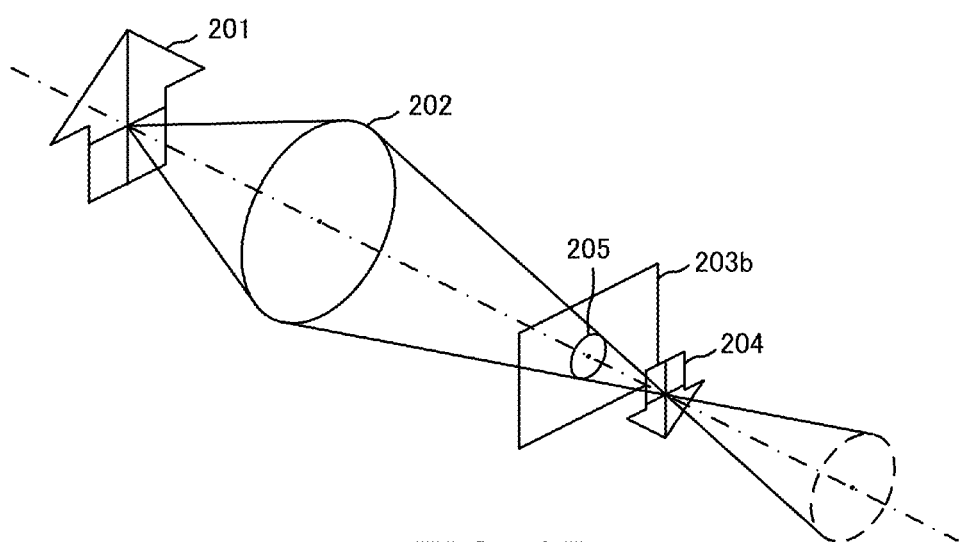
FIG. 2B is a diagram of illustrating a situation where the object image is formed on the imaging plane in this embodiment.

FIG. 2B illustrates a case where the imaging plane of the image and the image sensor surface do not coincide with each other. When an image sensor surface 203b is located at a position different from the plane 203a illustrated in FIG. 2A, the object 201 imaged by the optical lens 202 is formed on the image sensor 203b as a circle of confusion 205. When the circle of confusion 205 is smaller than a permissible circle of confusion of the image sensor, the circle of confusion 205 can be treated as equivalent to the "point" obtained in the in-focus state described above and an image which is equivalent to the in-focus image is obtained. On the other hand, when the circle of confusion 205 is larger than the permissible circle of confusion, a blurred image is obtained on the image sensor surface 203b.

Figure 2C:
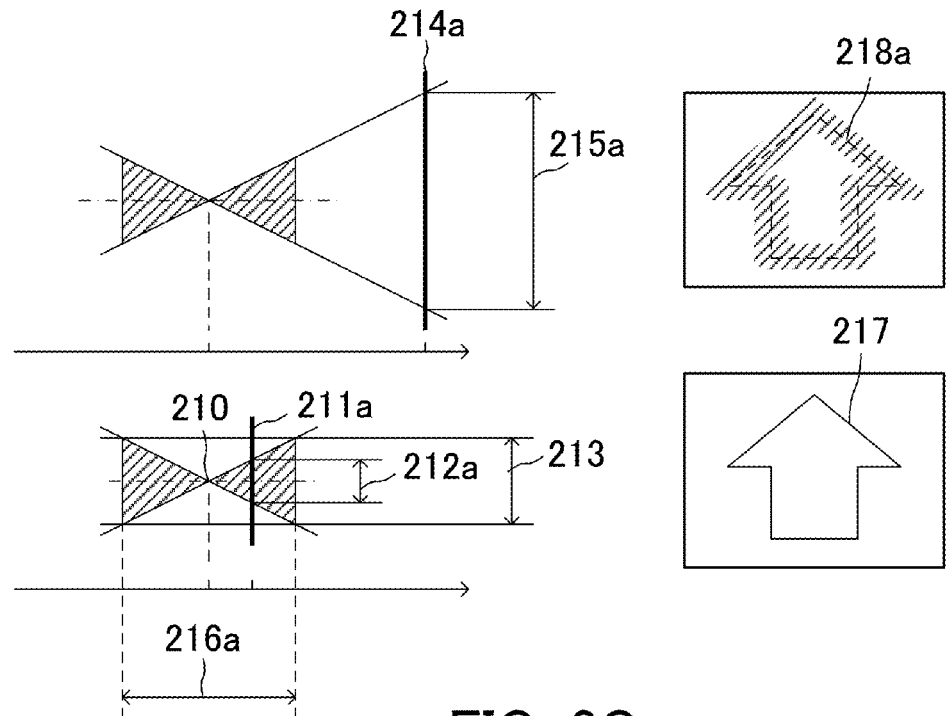
FIG. 2C is a diagram of illustrating a situation where the object image is formed on the imaging plane in this embodiment.

FIG. 2C is a diagram of illustrating the above situation when viewed from a lateral side. When the object is imaged on a focal point 210 and the image sensor is located on a position of a plane 211a, a diameter 212a of the circle of confusion is obtained. In this case, the diameter 212a of the circle of confusion is smaller than a diameter 213 of the permissible circle of confusion. Therefore, an image 217 recorded by the image sensor is an in-focus image which is not blurred. On the other hand, when the image sensor is located on a position of a plane 214a, a diameter 215a of the circle of confusion is larger than a diameter 213 of the permissible circle of confusion. Therefore, an image 218a on the image sensor surface 214a is a blurred image. A shaded region in which the diameter 212a of the circle of confusion is smaller than the diameter 213 of the permissible circle of confusion is a depth of focus 216a, and it can be converted and replaced with a value at an object side as a depth of field.

Figure 2D:
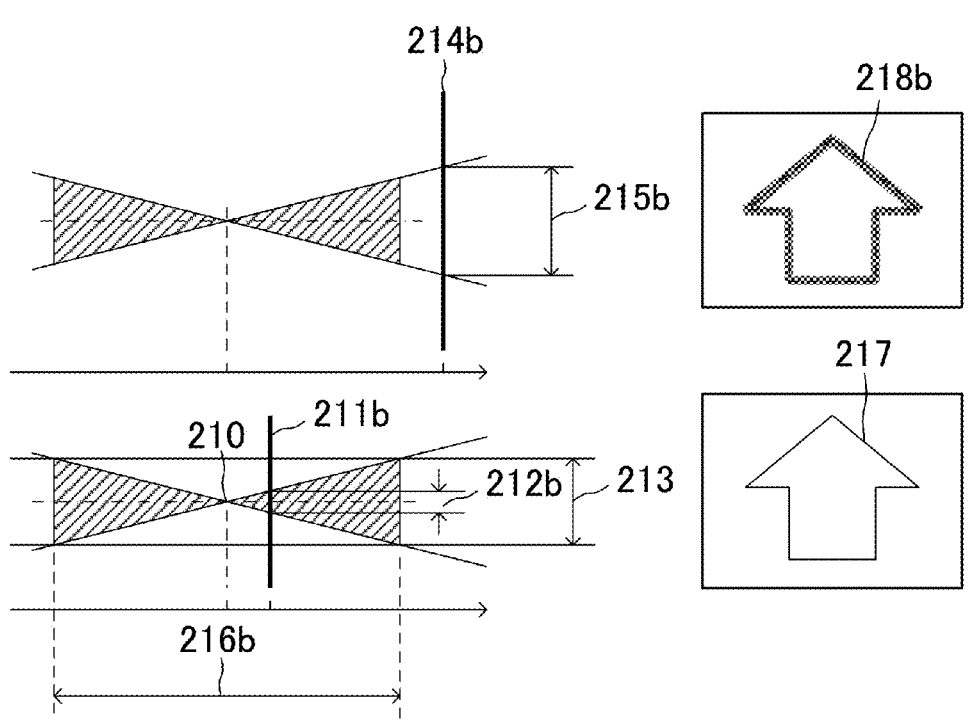
FIG. 2D is a diagram of illustrating a situation where the object image is formed on the imaging plane in this embodiment.

FIG. 2D is a diagram of illustrating a situation where an aperture stop is further closed compared to the situation of FIG. 2C. In the situation where the aperture stop is further closed, the diameter of the circle of confusion is changed to a diameter 212b of the circle of confusion for a plane 211b and a diameter 215b of the circle of confusion for a plane 214b since the difference of the diameter of incident light causes the difference of the depth. In this case, compared to the diameter 215a of the circle of confusion in FIG. 2C, the diameter 215b of the circle of confusion in FIG. 2D is small. Therefore, an image 218b obtained in this case is an image with a blur amount less than that of the image 218a. A depth of focus 216b in this case is wider and deeper than the depth of focus 216a.

Figure 3:
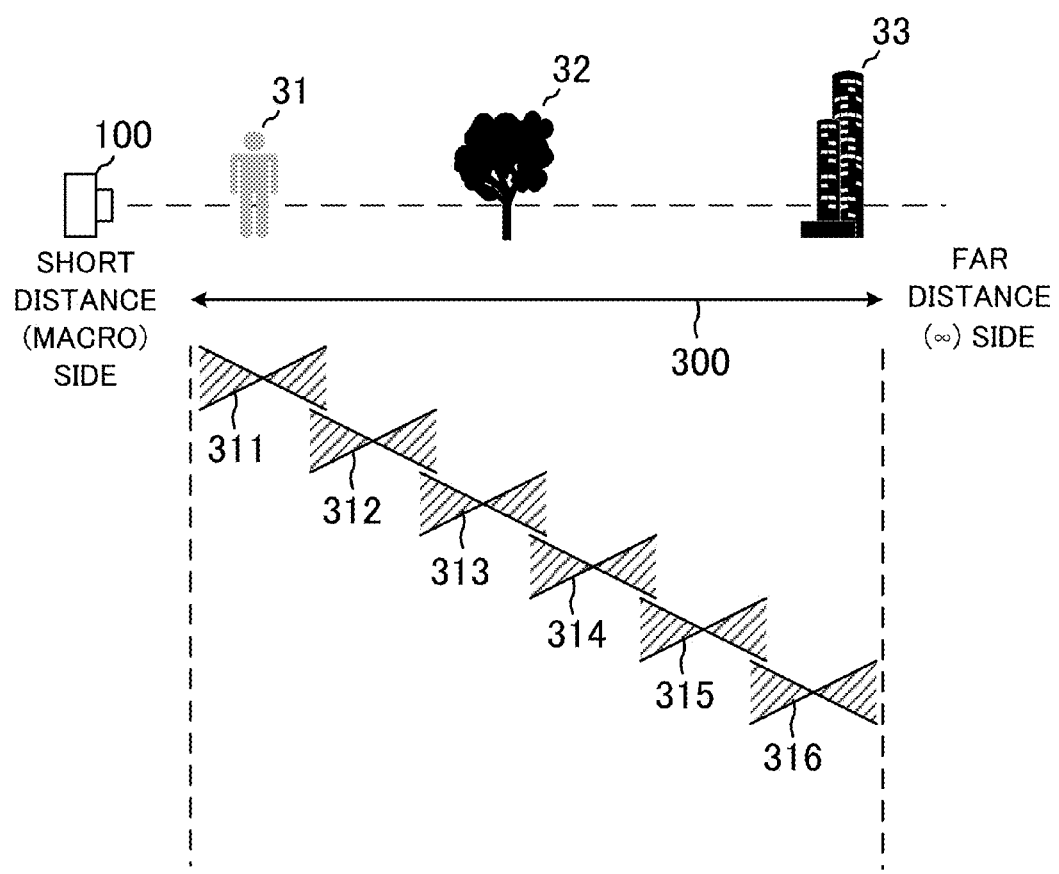
FIG. 3 is a diagram of explaining an all-in-focus image shooting in this embodiment.

FIG. 3 is a diagram of explaining the all-in-focus image shooting in this embodiment. In this case, objects 31 to 33 are assumed as focusing objects. The objects 31 to 33 exist at distances (object distances) different from each other, and the objects 31, 32, and 33 are located in this order from the image pickup apparatus 100 (i.e., in a direction from a short distance toward a far distance). In order to obtain the all-in-focus image which is focused on the plurality of objects 31 to 33, it is necessary to cover a focal range 300

(bracket range) in which the focus bracketing is performed with a plurality of depths of focus. Reference numerals 311 to 316 denote depths of focus in respective image shootings, and they are arranged to cover the focal range 300. In other words, when images are shot at in-focus positions corresponding to the respective depths of focus 311 to 316 (six shootings), the objects 31 to 33 within the focal range 300 are in an in-focus state in any of the images. Furthermore, when the regions within the depths of focus in respective image shootings are synthesized based on the plurality of shot images (i.e., image synthesis is performed), an image which is focused in an entire range of the focal range 300 (entire bracket range) can be obtained.

[All-In-Focus Image Shooting Mode]

Figure 4:
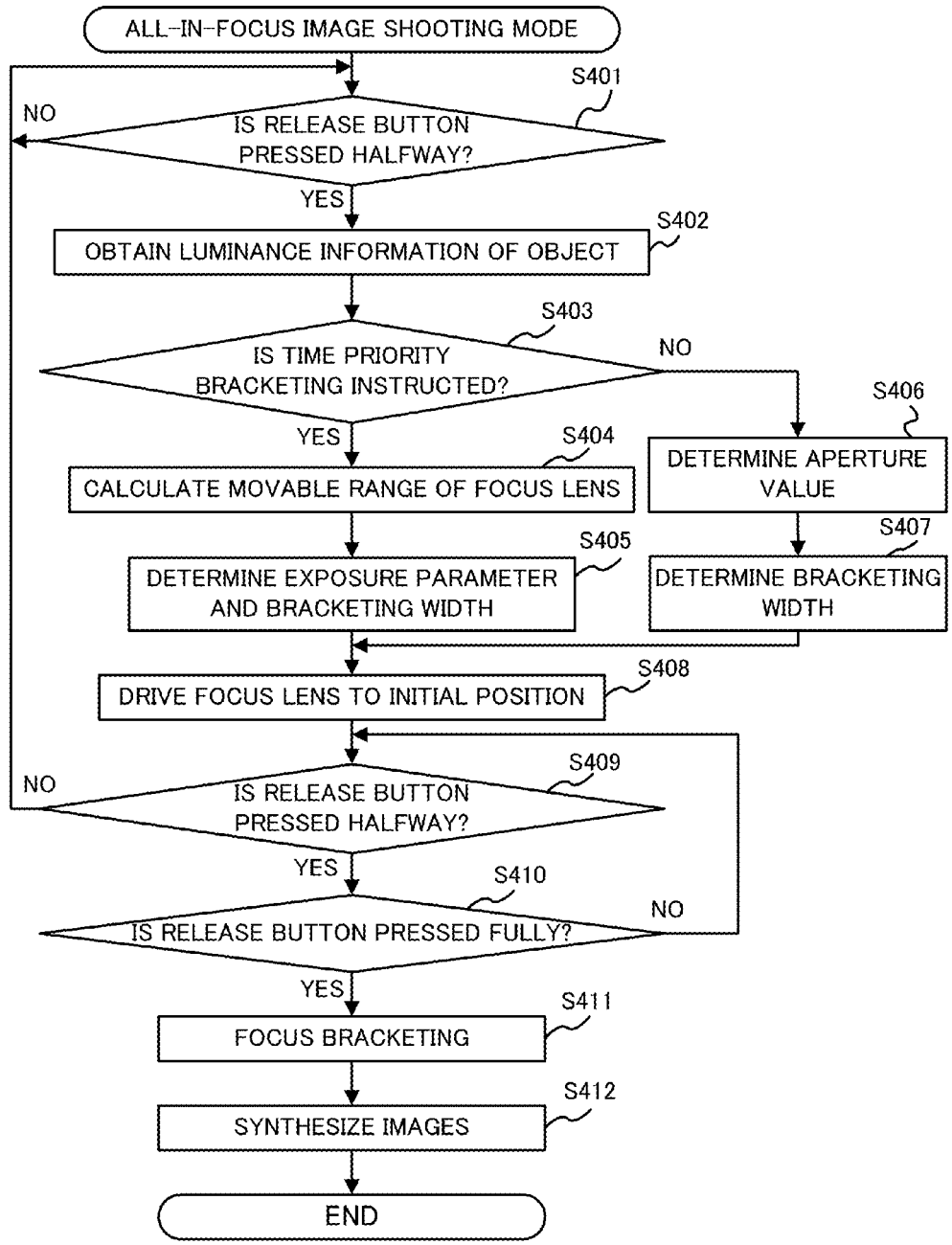
FIG. 4 is a flowchart of illustrating a sequence of an all-in-focus image shooting mode in this embodiment.

Next, referring to FIG. 4, a sequence of the all-in-focus image shooting mode in this embodiment will be described. FIG. 4 is a flowchart of illustrating the sequence of the all-in-focus image shooting mode. Each step in FIG. 4 is performed mainly by the system controller 120 according to a program that is previously stored in the internal memory 108.

When the all-in-focus image shooting mode is selected via the shooting mode switch 118, the system controller 120 performs step S401. At step S401, the system controller 120 determines whether the release switch 117 is pressed halfway by a user. When the release switch 117 is pressed halfway by the user, the flow proceeds to step S402. On the other hand, when the release switch 117 is not pressed halfway by the user, the flow repeats step S401.

At step S402, the image processing circuit 107 obtains luminance information (exposure value: EV) of an object based on an instruction of the system controller 120. Subsequently, at step S403, the system controller 120 determines whether time priority bracketing is instructed via the operating member 116 by the user. When the time priority bracketing is instructed by the user, the flow proceeds to step S404. On the other hand, when the time priority bracketing is not instructed by the user, the flow proceeds to step S406.

At step S404, the system controller 120 calculates, based on a range (focusable range) where focusing by the image pickup apparatus 100 (lens barrel 101) is possible, a movable amount of the focus lens 103 corresponding to an entire region of the focusable range. The focusable range is determined depending on an optical performance of the lens barrel 101, and it is a range from a focusable limiting point at the short distance (macro) side to a focusable limiting point at the far distance (infinity) side. The focusable range may change depending on a focal length (zoom magnification) in some cases. In this case, at step S404, the system controller 120 calculates (determines) the focal length based on a current position of the zoom lens 102, and calculates the focusable range and the movable amount of the focus lens 103 depending on the focal length.

Subsequently, at step S405, the system controller 120 determines an exposure parameter (shooting condition) and a focus bracketing width, i.e., a moving amount of the focus lens 103 for each image shooting (determination step). The exposure parameter and the focus bracketing width are determined based on the movable amount of the focus lens 103 calculated at step S404 and the luminance information of the object obtained at step S402. In this embodiment, this determination process is referred to as a bracketing sequence determination process.

Referring to FIGS. 5A to 5D, the bracketing sequence determination process will be described. FIGS. 5A to 5D are diagrams of explaining the bracketing sequence determination process.

FIG. 5A is a table of a combination pattern of aperture values (A) and shutter speeds (B) to achieve a correct exposure under a specific luminance condition. There are a plurality of combination patterns, as patterns I to X, of the aperture values (A) and the shutter speeds (B) to achieve the correct exposure under the same luminance condition. For example with respect to the pattern I, when the aperture value (A) is set to F2.0, the shutter speed (B) to achieve the correct exposure is $\frac{1}{250}$ (sec). Similarly, for the pattern X, when the aperture value (A) is set to F32, the shutter speed (B) to achieve the correct exposure is 1 (sec). The combination pattern of the aperture value (A) and the shutter speed (B) needs to be changed according to the luminance information of the object obtained at step S402 in FIG. 4. In this embodiment, these combination patterns and values to be changed according to the luminance information of the object (i.e. a plurality of combination patterns for each luminance information) are previously stored in the internal memory 108.

Next, the relationship between the aperture value and the bracketing width (moving amount) of the focus lens 103 needed to perform the all-in-focus image shooting will be described. In order to perform the all-in-focus image shooting, it is necessary to focus on each of all objects in at least one of images. When the aperture value is small (the stop is open), i.e., a depth of field is shallow, it is necessary to set the bracketing width to be small since a focusing range (in-focus range) is narrow. On the other hand, when the aperture value is large (the stop is closed), i.e., the depth of field is deep, it is possible to set the bracketing width to be large since the focusing range (in-focus range) is wide.

FIG. 5B is a table of illustrating a relationship between the aperture value (A) in FIG. 5A and the bracketing width (C). For example with respect to the pattern I, the aperture value (A) is F2.0 and the bracketing width (C) is 100 pulses. The pulse means a unit of convenience that defines a driving step of the focus lens 103 in this embodiment. On the other hand, for the pattern X, the aperture value (A) is F32 and the bracketing width (C) is 500 pulses. As described above, in this embodiment, the bracket width (C) is smaller as the aperture value (A) decreases, and the bracket width (C) is larger as the aperture value (A) increases. In this embodiment, the bracketing width (C) depending on the aperture value (A) is previously stored in the internal memory 108.

Furthermore, a necessary number (D) that is the number of image shootings needed to perform the all-in-focus image shooting can be obtained by the following relational expression, based on the bracketing width (C) and the movable amount of the focus lens 103 over the entire region of the focusable range calculated at step S404 in FIG. 4.

$$\text{NECESSARY NUMBER } (D) = \text{MOVABLE AMOUNT/BRACKETING WIDTH } (C)$$

When the movable amount (movable amount of the focus lens 103) is assumed to be 1000 pulses in this embodiment, for example the necessary number (D) for the pattern I is ten. Similarly, the necessary number (D) for the pattern X is two. As described above, the necessary number (D) is greater as the aperture value (A) decreases, and the necessary number (D) is fewer as the aperture value (A) increases.

When a moving velocity of the focus lens 103 is assumed to be 1000 pulse/sec in this embodiment, a focus bracketing time (E) that is a time required for the focus bracketing to perform the all-in-focus image shooting can be obtained by the following relational expression.

FOCUS BRACKETING TIME (E)=BRACKETING WIDTH (C)/1000×(NECESSARY NUMBER (D)−1)

For example with respect to the pattern I, the focus bracketing time (E) is 0.9 sec. Similarly, with respect to the pattern X, the focus bracketing time (E) is 0.5 sec.

As described above, the focus bracketing time required in the all-in-focus image shooting varies depending on the aperture value. Specifically, the focus bracketing time is longer as the aperture value decreases, and the focus bracketing time is shorter as the aperture value increases.

Next, referring to FIG. 5C, the relationship between the shutter speed and the shooting time will be described. FIG. 5C is a table of illustrating the relationship between the shutter speed (B) in FIG. 5A and the shooting time (image shooting time (F)) of images needed to perform the all-in-focus image shooting.

For example with respect to the pattern I, the shutter speed (B) is 1/250 sec, and it is the shooting time per one image shooting. For the pattern I, as illustrated in FIG. 5B, the necessary number (D) is ten. Therefore, the image shooting time (F) is 1/25=0.04 sec. Similarly, with respect to the pattern X, the shutter speed (B) is 1 sec, and it is the shooting time per one image shooting. For the pattern X, as illustrated in FIG. 5B, the necessary number (D) is two. Therefore, the image shooting time (F) is 2 sec. As described above, the image shooting time (F) varies depending on the shutter speed (B) and the necessary number (D). A total required time (all-in-focus image shooting time) in one image shooting operation for the all-in-focus image shooting is a sum of the focus bracketing time (E) and the image shooting time (F) described above.

FIG. 5D is a table of indicating an all-in-focus image shooting time (G) for the combination pattern of the aperture value (A) and the shutter speed (B) in FIG. 5A. For example with respect to the pattern I, as described above, the focus bracketing time (E) is 0.9 sec, and the image shooting time (F) is 0.04 sec. Therefore, the all-in-focus image shooting time (G) is 0.94 sec that is a sum of the focus bracketing time (E) and the image shooting time (F). Similarly, with respect to the pattern X, the focus bracketing time (E) is 0.5 sec, and the image shooting time (F) is 2 sec. Therefore, the all-in-focus image shooting time (G) is 2.5 sec that is the sum of the focus bracketing time (E) and the image shooting time (F).

As described above, with respect to the pattern X, compared to the pattern I, the aperture value (A) is larger, i.e., the depth of field is deeper to reduce the number of image shootings (necessary number (D)) in the all-in-focus image shooting, but the all-in-focus image shooting time (G) increases. In this embodiment, the aperture value (A) and the shutter speed (B) are selected as exposure parameters so as to reduce (preferably minimize) the all-in-focus image shooting time (G). Then, the bracketing width (C) is set depending on the selected aperture value (A) (exposure parameter) to reduce (preferably minimize) the required image shooting time in one image shooting operation for the all-in-focus image shooting. Thus, in this embodiment, the bracketing sequence determination process is performed.

Hereinafter, going back to the flowchart of FIG. 4, the sequence of the all-in-focus image shooting mode will be described. When the time priority bracketing is not instructed by the user at step S403, at step S406, the system controller 120 determines the exposure parameter (aperture value) based on the luminance information of the object obtained at step S402. When the luminance information of the object obtained at step S402 is assumed to be the same as that of the above example, the combination pattern of the aperture value (A) and the shutter speed (B) is as illustrated in FIG. 5A. Since the time priority bracketing is not instructed at step S403, as the exposure parameter at step S406, the parameter I in which the aperture value (A) is F2.0 is selected and the shutter speed (B) for the correct exposure is 1/250 sec.

Subsequently, at step S407, the system controller 120 determines the bracketing width of the focus lens 103 (and the number of image shootings (necessary number)) needed to perform the all-in-focus image shooting, based on the aperture value determined at step S406. When the relationship between the aperture value and the bracketing width is assumed to be the same as that of the above example, as illustrated in FIG. 5B, for the pattern I, the aperture value (A) is F2.0 and the bracketing width (C) is 100 pulses. Accordingly, in this case, the bracketing width is determined to be 100 pulses.

Subsequently, at step S408, the system controller 120 drives the focus lens 103 to a bracketing start position (initial position) according to the bracketing width determined at step S405 or S407. Then, at step S409, the system controller 120 determines whether the state in which the release switch 117 is being pressed halfway by the user continues. When the state in which the release switch 117 is being pressed halfway by the user continues, the flow proceeds to step S410. On the other hand, when the state in which the release switch 117 is being pressed halfway by the user is removed, the flow returns to step S401.

At step S410, the system controller 120 determines whether the release switch 117 is fully pressed by the user. When the release switch 117 is fully pressed by the user, the flow proceeds to step S411. On the other hand, when the release switch 117 is not fully pressed by the use, the flow returns to step S409.

At step S411, the system controller 120 performs the focus bracketing (control step). In the focus bracketing, the system controller 120 first drives the stop/shutter 105 using the stop/shutter drive unit 112 so as to have the exposure parameter determined at step S405 or step S406 to perform the image shooting. Then, the system controller 120 determines the number of image shootings, and it determines whether the number reaches the necessary number determined at step S405 or step S407. When the number of the image shootings does not reach the necessary number, the system controller 120 drives the focus lens 103 using the focus lens drive unit 114 according to the bracketing width determined at step S405 or step S407 to further shoot images. As described above, the system controller 120 repeats the image shootings at a plurality of different positions (focus positions) of the focus lens 103 to perform the image shootings by the necessary number determined at step S405 or S407. Each shot image is stored in the internal memory 108.

Subsequently, at step S412, the system controller 120 (image synthesizing unit 126) synthesizes (combines) the plurality of images (image data) shot at step S411 (synthesis step). Specifically, the image synthesizing unit 126 synthesizes the plurality of image data shot at step S411 based on a contrast evaluation value to generate an image based on the plurality of image data. When synthesizing the images, the image synthesizing unit 126 first compares the contrast evaluation value of each image based on the contrast evaluation value of each image determined by the contrast evaluation value obtaining unit 122, and it extracts a pixel portion where the contrast evaluation value is maximized. Then, it overlaps the pixel portion extracted from each image for each pixel corresponding to each region of the finally-generated image to generate an image which focuses on an entire object (all the objects) based on the plurality of image data. The method of synthesizing the images is not limited to this, and other methods may can also be used to synthesize the images (i.e., obtain the all-in-focus image).

As described above, in this embodiment, a determination unit (shooting condition determination unit 125a) determines, based on luminance information of an object, a shooting condition from among a plurality of shooting conditions containing information on an aperture value (F number) and a shutter speed. A control unit (focus bracketing control unit 125) performs control so as to sequentially shoot a plurality of images having in-focus positions different from each other while discretely moving a focus lens 103 by each moving amount (focus bracketing width) depending on the aperture value. An image synthesizing unit (image synthesizing unit 126) synthesizes the plurality of images. The determination unit determines the shooting condition from among the plurality of shooting conditions so as to reduce a time for shooting the plurality of images (all-in-focus image shooting time (G)).

Preferably, the plurality of shooting conditions are a plurality of exposure parameters to obtain a correct exposure based on the luminance information of the object. Preferably, the plurality of shooting conditions include a first shooting condition containing information on a first aperture value and a first shutter speed (for example, pattern X) and a second shooting condition containing information on a second aperture value and a second shutter speed (for example, pattern I). The determination unit determines, as the shooting condition, one of the first and second shooting conditions so as to reduce the time for shooting the images. Preferably, the time for shooting the images is a first time (for example, 2.5 sec for the all-in-focus image shooting time (G) in the pattern X) when the first shooting condition is to be used, and the time for shooting the images is a second time (for example, 0.94 sec for the all-in-focus image shooting time (G) in the pattern I) that is shorter than the first time when the second shooting condition is to be used. The determination unit determines the second shooting condition to be used as the shooting condition. More preferably, the determination unit determines the shooting condition (for example, the shortest all-in-focus image shooting time (G) in the patterns I to X) from among the plurality of shooting conditions so that the time for shooting the images is minimized.

Preferably, the determination unit determines, based on the luminance information obtained by an obtaining unit (object detection unit 121), the shooting condition from among the plurality of shooting conditions. Preferably, the time for shooting the images is a sum of a first time (focus bracketing time (E)) that is determined based on the moving amount and the number of shootings of the plurality of images (necessary number (D)) and a second time (image shooting time (F)) that is determined based on the shutter speed and the number of the shootings.

Preferably, the image pickup apparatus 100 includes a storage unit (internal memory 108) which stores the plurality of shooting conditions. The determination unit determines the shooting condition from among the plurality of shooting conditions stored in the storage unit. Preferably, the storage unit stores the time for shooting the images that corresponds to each of the plurality of shooting conditions. Preferably, the control unit performs an all-in-focus image shooting by focus bracketing.

Preferably, the image pickup apparatus 100 includes a setting unit (shooting mode switch 118) capable of selectively setting a first mode normally set (common bracketing mode) and a second mode (time priority bracketing mode) in which priority is given to a time. The determination unit determines a predetermined shooting condition (for example, pattern I) based on the luminance information of the object when the first mode is set. The determination unit determine the shooting condition (for example, pattern III) from among the plurality of shooting conditions so as to reduce the time for shooting the images when the second mode is set.

According to this embodiment, when a time priority bracketing is instructed by a user in an all-in-focus image shooting, an exposure parameter and a focus bracketing width can be automatically set so as to reduce (preferably minimize) a required time for one all-in-focus image shooting. In this embodiment, the image pickup apparatus 100 is a digital camera, but this embodiment is not limited to this, and can also be applied to other image pickup apparatuses such as camera-equipped cell-phones.

According to this invention, an image pickup apparatus, a method of controlling the image pickup apparatus, and a non-transitory computer-readable storage medium can be provided which are capable of obtaining an all-in-focus image in a short time.

[Other Embodiments]

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-097578, filed on May 9, 2014, which is hereby incorporated by reference wherein in its entirety.

What is claimed is:

1. An image pickup apparatus comprising:
a processor; and
a memory including instructions that, when executed by the processor, cause the processor to:
(a) select, based on luminance information of an object, a plurality of shooting conditions, wherein the plurality of shooting conditions contain information on an aperture value and a shutter speed;
(b) acquire a time for shooting a plurality of images based on a moving amount of a focus lens dependent on the aperture value, the number of shootings of the plurality of the images, and the shutter speed in each of the plurality of shooting conditions;
(c) determine a shooting condition from among the plurality of shooting conditions based on the time for shooting the images of each of the plurality of shooting conditions; and
(d) perform control so as to sequentially shoot the plurality of images having in-focus positions different from each other while discretely moving the focus lens by each moving amount depending on the aperture value.

2. The image pickup apparatus according to claim 1, wherein the plurality of shooting conditions are a plurality of exposure parameters to obtain a correct exposure based on the luminance information of the object.

3. The image pickup apparatus according to claim 1, wherein the instructions, when executed by the processor, further cause the processor to determine the shooting condition from among the plurality of shooting conditions so that the time for shooting the images is minimized.

4. The image pickup apparatus according to claim 1, wherein the time for shooting the images is a sum of a first time that is determined based on the moving amount and the number of shootings of the plurality of images and a second time that is determined based on the shutter speed and the number of the shootings.

5. The image pickup apparatus according to claim 1, wherein the instructions, when executed by the processor, further cause the processor to perform an all-in-focus image shooting by focus bracketing.

6. The image pickup apparatus according to claim 1, wherein the instructions, when executed by the processor, further cause the processor to:
set a first mode normally set or a second mode in which priority is given to a time,
determine a predetermined shooting conditions based on the luminance information of the object when the first mode is set, and
determine the shooting condition from among the plurality of shooting conditions based on the time for shooting the images when the second mode is set.

7. The image pickup apparatus according to claim 1, wherein the instructions, when executed by the processor, further cause the processor to synthesize the plurality of images.

8. The image pickup apparatus according to claim 1, wherein the memory stores the plurality of shooting conditions.

9. The image pickup apparatus according to claim 8, wherein the memory stores the time for shooting the images that corresponds to each of the plurality of shooting conditions.

10. A method of controlling an image pickup apparatus, the method comprising:
a selection step of selecting, based on luminance information of an object, a plurality of shooting conditions, wherein the plurality of shooting conditions contain information on an aperture value and a shutter speed;
an acquisition step of acquiring a time for shooting a plurality of images based on a moving amount of a focus lens dependent on the aperture value, the number of shootings of the plurality of the images, and the shutter speed in each of the plurality of shooting conditions;
a determination step of determining a shooting condition from among the plurality of shooting conditions based on the time for shooting the images of each of the plurality of shooting conditions; and
a control step of performing control so as to sequentially shoot the plurality of images having in-focus positions different from each other while discretely moving the focus lens by each moving amount depending on the aperture value.

11. A non-transitory computer-readable storage medium which stores a program to cause a computer to execute a process comprising:
a selection step of selecting, based on luminance information of an object, a plurality of shooting conditions, wherein the plurality of shooting conditions contain information on an aperture value and a shutter speed;
an acquisition step of acquiring a time for shooting a plurality of images based on a moving amount of a focus lens dependent on the aperture value, the number of shootings of the plurality of the images, and the shutter speed in each of the plurality of shooting conditions;
a determination step of determining a shooting condition from among the plurality of shooting conditions based on the time for shooting the images of each of the plurality of shooting conditions; and
a control step of performing control so as to sequentially shoot the plurality of images having in-focus positions different from each other while discretely moving the focus lens by each moving amount depending on the aperture value.

* * * * *